US010862199B1

(12) United States Patent
Zhang et al.

(10) Patent No.: US 10,862,199 B1
(45) Date of Patent: Dec. 8, 2020

(54) MULTI SYSTEM MULTI BAND ANTENNA AND ANTENNA ARRAYS ASSEMBLY

(71) Applicant: The Boeing Company, Chicago, IL (US)

(72) Inventors: Henry Z. Zhang, Bellevue, WA (US); Guillermo H. De Vivero, Everett, WA (US); Anil Kumar, Sammamish, WA (US); Daniel J. Ellis, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/789,909

(22) Filed: Feb. 13, 2020

(51) Int. Cl.
*H04B 7/185* (2006.01)
*H01Q 1/28* (2006.01)
*H01Q 21/30* (2006.01)
*H04B 7/06* (2006.01)
*H01Q 21/00* (2006.01)

(52) U.S. Cl.
CPC .......... *H01Q 1/283* (2013.01); *H01Q 21/0025* (2013.01); *H01Q 21/30* (2013.01); *H04B 7/0613* (2013.01)

(58) Field of Classification Search
CPC .............. H04B 7/0404; H04B 7/0613; H04B 7/18506; H01Q 1/283; H01Q 1/325; H01Q 21/0025; H01Q 21/30; H01Q 21/29; H01Q 25/04
See application file for complete search history.

(56) References Cited

U.S. PATENT DOCUMENTS

| | | | | |
|---|---|---|---|---|
| 2006/0229104 | A1* | 10/2006 | de La Chapelle | H04B 7/18506 455/562.1 |
| 2014/0327577 | A1* | 11/2014 | Ozaki | H01Q 1/283 342/367 |
| 2016/0064807 | A1 | 3/2016 | Reed et al. | |
| 2016/0205560 | A1* | 7/2016 | Hyslop | H04B 7/18506 455/454 |
| 2017/0064807 | A1 | 3/2017 | Ilic et al. | |
| 2017/0187105 | A1* | 6/2017 | Emerick | H01Q 21/22 |
| 2019/0089419 | A1 | 3/2019 | Kim et al. | |
| 2020/0212978 | A1* | 7/2020 | Zhao | H04B 7/0691 |

* cited by examiner

*Primary Examiner* — Thanh C Le
(74) *Attorney, Agent, or Firm* — Gates & Cooper LLP (57) ABSTRACT

A method and apparatus for transmitting RF signals is described. In one embodiment, the apparatus is evidenced by a multi-band antenna assembly. The multi-band antenna assembly comprises of a base portion, a blade antenna supporting omni-directional beam while the second one is an antenna array that has a directional beam. The top portion comprises a first surface facing away from the base portion, the first surface having an first antenna array including a plurality of first antenna elements; a second surface facing the base portion; and a peripheral surface on a periphery of the top portion and disposed between the first surface and the second surface, the peripheral surface comprising one or more further antenna arrays having a plurality of further antenna elements.

20 Claims, 11 Drawing Sheets

FIG. 1

FIG. 2C
Top View

FIG. 2B
Side View

FIG. 2A
Front View

FIG. 3A
Front View

FIG. 3B
Side View

FIG. 3C
Top View

MULTI SYSTEM MULTI BAND ANTENNA AND ANTENNA ARRAYS ASSEMBLY

BACKGROUND

1. Field

The present disclosure relates to systems and methods for communicating information via antennas, and in particular on a system of multi-band antennas

2. Description of the Related Art

Existing wireless communication systems deploy their own antenna for a single band for an omni-directional coverage area. Multiple systems need to deploy multiple antennas for the specified band and coverage. Configuration of the multiple antennas requires a large surface area. It competes for the extremely valuable real estate with other systems in a vehicle with limited surface area. In addition, the congested antenna farm raises interference with other installed systems onboard. The multiple antennas also add to the weight and aerodynamic drag of the vehicle, negatively.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

To address the requirements described above, this document discloses a multi-band antenna assembly, including: a base portion, adapted to be coupled to an outer surface of a vehicle; a blade portion, having a first end coupled to the base portion and a second end; a top portion coupled to the second end of the blade portion distal from the first end of the blade portion, the top portion including: a first surface facing away from the base portion, the first surface having an first antenna array including a plurality of first antenna elements; a second surface facing the base portion; and a peripheral surface on a periphery of the top portion and disposed between the first surface and the second surface, the peripheral surface including one or more further antenna arrays having a plurality of further antenna elements.

In one embodiment, the first antenna array has a first field of view toward a zenith and the one or more further antenna arrays augment the first field of view to provide a combined field of view having field of view greater than the first field of view. In another embodiment, at least a portion of the peripheral surface is forms an angle θ with the first surface. In one of such embodiments, θ>45. In still another embodiment, the one or more further arrays together provide an azimuthal field of view of 360 degrees.

Another embodiment is evidenced by a method of transmitting a first rf signal and transmitting a second rf signal via a same antenna assembly. The method comprises providing the first rf signal and the second rf signal to an antenna assembly, wherein the antenna assembly is described as above. The method also includes transmitting also includes concurrently transmitting the first rf signal via the first plurality of antenna elements and the second rf signal via at least a subset of the plurality of further antenna elements.

The foregoing antenna assembly supports multiple wireless systems and a wide range of frequency bands. The antenna assembly comprises a blade antenna with a top-hat panel containing antenna arrays on the top and side of the panel. The antenna array on the top of the panel covers the vertical radiation area (up to 90 degree elevation angle) while the antenna arrays on the side cover the entire horizontal range (360 degrees azimuth angle). The blade antenna simultaneously provides typical omnidirectional radiation coverage for the same or different frequency bands, and can be replaced with a panel housing multiple monopole antennas for MIMO operation.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The systems and method disclosed herein consolidates multiple antennas and antenna arrays for multiple systems having multiple use cases into one single antenna assembly. It provides omnidirectional coverage for the lower frequency band, such as 4G/long term evolution (LTE)/Fifth Generation (5G)-sub 6 GHz band (below 6 GHz), and directional beam coverage for the higher frequency band, such as 5G-millimeter wave (mm Wave) band, simultaneously. It addresses installation, operational, performance and maintainability challenges inherent with deploying multiple wireless communication systems in a constrained environment such as an air, terrestrial, maritime or space vehicle. The compact physical size of the assembly reduces the installation limitations caused by finite installation surface area and the resulting co-site restriction, and weight and aerodynamic drag on the vehicle. The assembly with antenna arrays solves the concerns of insufficient antenna gain for the higher frequency band. The assembly with antenna arrays also solves the electrical performance concerns such as lack of electrical scanning capability, inability for spatial multiplex and limited connectivity link range. The single assembly solves the maintainability challenges such as maintenance and replacement costs for multiple antennas.

The assembly that combines of multiple antenna arrays for multi-system and multi-band communication, and comprises a blade having one or more monopole antennas (for example, for LTE/5G-sub 6 GHz cellular communication) with a top-hat panel (for example, for 5G millimeter wave cellular/satellite communication). The blade/monopole antennas operate in a lower frequency band while the antenna arrays located in the top-hat panel operate in a higher frequency band. The assembly is compact, provides 360° coverage, and addresses the concerns of limited real estate, weight and aerodynamic drag in vehicles traveling in constrained environments, including air, terrestrial, or maritime.

The assembly simplifies vehicle design and manufacture while also reducing overall weight. The assembly can also be used in other applications having physically constrained environments such as aerospace, automotive, and/or maritime.

Communication System

Figure 1:
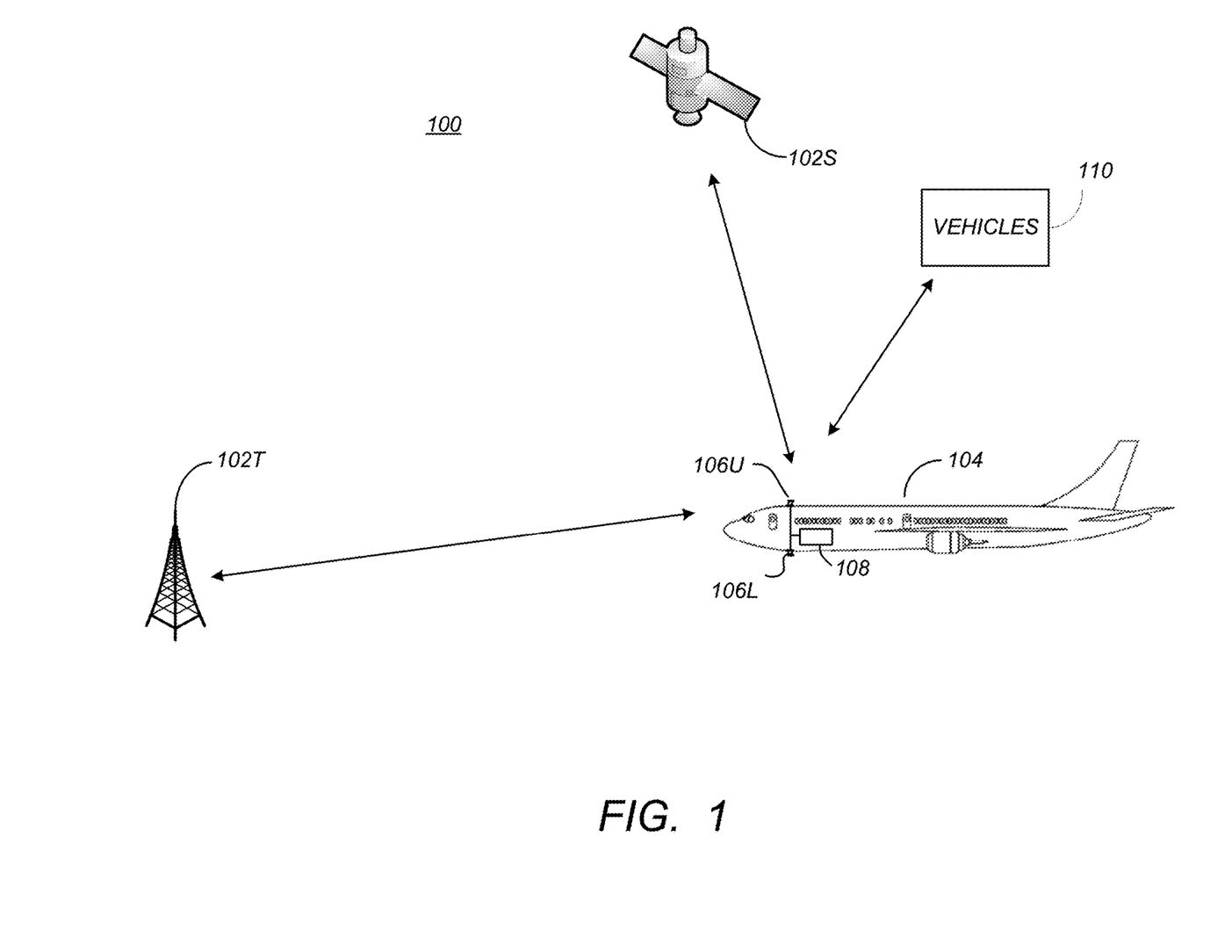
FIG. 1 is a diagram of an communication system.

FIG. 1 is a diagram of an communication system 100. The communication system comprises a vehicle 104 such as an aircraft, and transceivers 102, which can include one or more of a terrestrial transceiver 102T and an airborne or satellite transceiver 102S and other vehicles 110. This includes communication with other vehicles equipped with similar capabilities for communication. The vehicle 104 includes one or more integrated antenna assemblies (IAAs) 106. In one embodiment, the IAAs 106 include a first or upper IAA 106U mounted on an upper outer surface of the vehicle and a second or lower IAA 106 mounted on a lower outer surface of the vehicle 104. The IAAs 106 are communicatively coupled to a communication controller 108 which provide and accept data and controls from other aircraft subsystems, including the IAAs 106. The IAA 106 is used to communicate data that may include passenger or crew communication data (e.g. cellphone person-to-person communications, Internet communications via the passenger internet service provider (ISP) or an ISP provided by the aircraft 104), as well as avionics and/or cockpit data.

Integrated Antenna Assembly

Figure 2A:
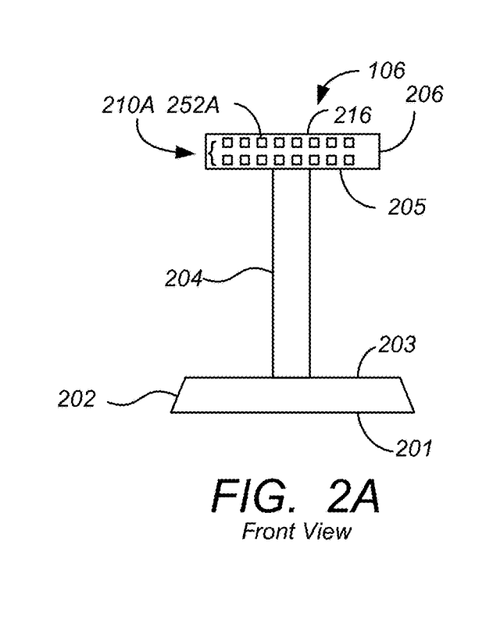
FIGS. 2A-2C are a diagrams of an exemplary embodiment of an integrated antenna assembly.
Figure 2B:
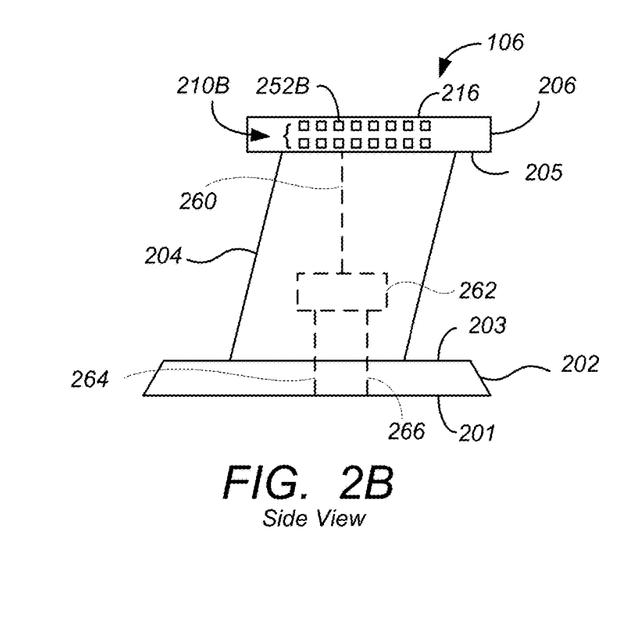
Figure 2C:
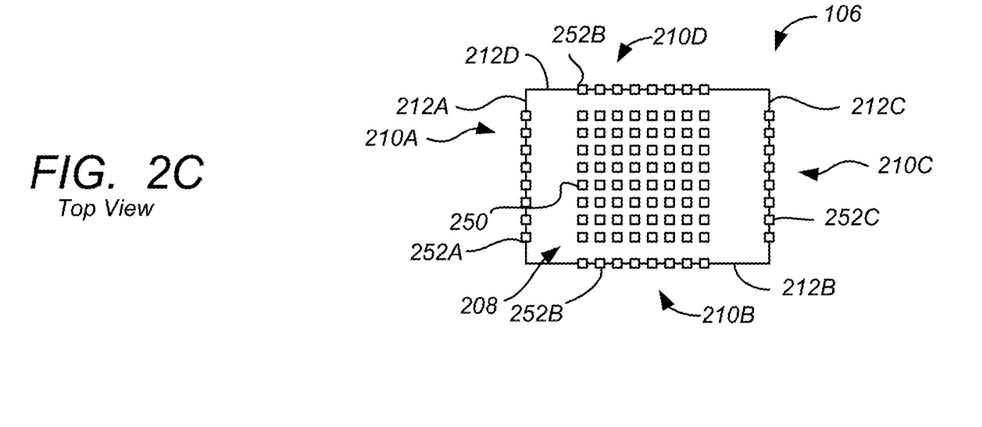

FIGS. 2A-2C are a diagrams of an exemplary embodiment of the IAA 106. FIG. 2A presents a side view of the IAA 106. The IAA 106 includes a base portion 202, a blade portion 204 and a top portion 206. The base portion 202 is disposed at a first end of the blade portion 204 and adapted to be coupled to the vehicle (e.g., vehicle 104). The top portion 206 is disposed at a second end of the blade portion 204.

In one embodiment, the base portion 202 is coupled to an outer surface of the vehicle, for example, by mounting a first surface 201 of the base portion 202 to an outer surface or skin of the vehicle. In embodiments where the vehicle 104 has an outer skin that is transparent to RF energy, the IAA 106 can be mounted to an interior surface of the vehicle 104.

The IAA 106 also includes a blade portion 204, having a first end and a second end. As illustrated, the first end of the blade portion 204 is coupled to a second surface 203 of the base portion 202 and the second end is of the blade portion 204 is coupled to a second surface 205 of the top portion 206 distal from the first end of the blade portion 204. In one embodiment, the blade portion 204 has a cross section elongated about an axis substantially colinear with a velocity vector of the vehicle 104. The blade portion can also have a cross section of an aerodynamic tear drop shape.

The top portion 206 also comprises a first surface 216 facing away from the base portion 202 that has a plurality of first antenna elements 250. In the illustrated embodiment, the plurality of first antenna elements 250 are arranged in a first antenna array 208 of dimension 8×8. Other first antenna array 208 dimensions and sizes can be used.

The top portion also comprises a peripheral surface 212 on the periphery of the top portion and is disposed between the first surface 216 and the second surface 205. The peripheral surface 212 comprises one or more antenna arrays 210. In the illustrated embodiment, the peripheral surface 212 is substantially rectangular, and includes four sides or surfaces 212A-212D. Each of the sides 212 includes a plurality of first antenna elements 250. The top portion is typically disposed in a plane substantially perpendicular to a zenith (a point in the sky or celestial sphere directly above the observer) of a vehicle in horizontal flight.

The peripheral surface 212 comprises one or more further antenna arrays 210, each having a plurality of further antenna elements 252. In the illustrated embodiments, the peripheral comprises four further antenna arrays 210A-210D, each disposed on a respective side 212A-212D of the top portion, and each having respective antenna elements 252A-252D. In the illustrated embodiment, the elements of each of the further antenna arrays 210 are 2×8, but other numbers and arrangements of further antenna elements 252 can be used. These arrays are particularly useful for vehicle-to-vehicle (one-to-one or one-to-many) during in-flight off-board communications.

In one embodiment, the first antenna array 208 and the further antenna arrays 210 operate in Ku, K, Ka and V-band frequencies (range of 10-86 GHz).

FIG. 2B also illustrates the use of a control/RF module 262. The control/RF module 262 is used to accept commands and RF signals from the vehicle 104 via link 264 and provide RF signals from the vehicle to the antenna arrays 208 and 210, and to control the antenna elements of arrays 208 and 210 to perform beam forming and scanning via one or more links 260. Controllers collocated with the antenna arrays 208 and 210 can distribute RF energy to the antenna elements of the respective arrays. Power for the control module 262 and other elements of the IAA 106 is provided by link 266.

Figure 3A:
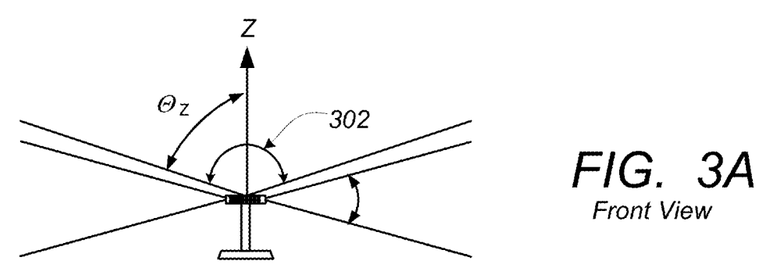
FIGS. 3A-3C are diagrams depicting the coverage achieved with the integrated antenna assembly.
Figure 3B:
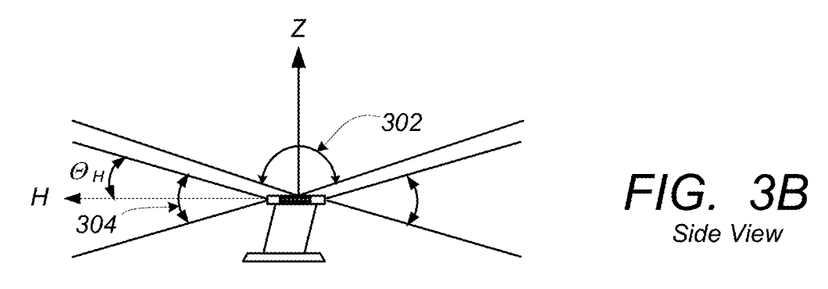
Figure 3C:
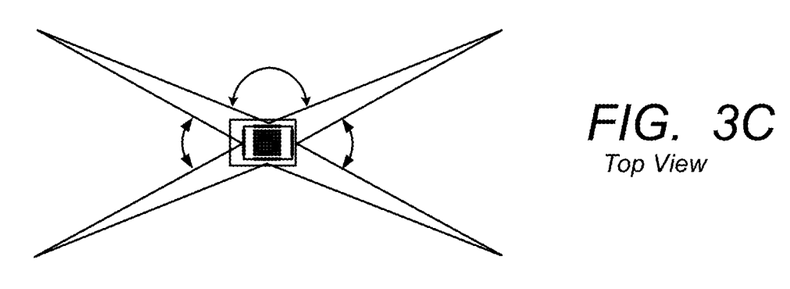

FIGS. 3A-3C are diagrams depicting the coverage achieved with the IAA 106. FIG. 3A depicts a front view of the IAA 106 depicting the field of view 302 provided by the IAA 106. The first antenna array 208 provides a first field of view 302 in the direction of zenith Z. The gain decrease with increase in scan angle will follow typical cosine roll-off for this array. The 2D-array is steerable in both azimuth and elevation planes. The center of the field of view 302 is nominally toward the zenith, and extends an angle $\theta_Z$ toward the horizon in all directions providing 180 degree or near 180 degrees of coverage in all directions perpendicular to the zenith, Z. As shown in FIG. 3B, each further antenna array 210 provides vertical a field of view 304 extending from a horizontal plane perpendicular to the zenith Z of an angle $\theta_H$. As shown in FIG. 3C, coverage is provided in an azimuthal field of view of 360 degrees about the zenith, with each of the further antenna arrays 210A-210D contributing to the total field of view. As illustrated, some of the further antenna arrays 210 can have different field of views than the other of the further antenna arrays, and the field of view of each of the further antenna arrays 210 can overlap. As illustrated, one or more of the further antenna arrays 210 augment the first field of view 302 to provide a combined field of view greater than the first field of view 302. For example, the addition of field of view 304 extends the first field of view 302 from the zenith by $\Theta_H$ 360 degrees in the horizontal plane. Further, field of view 304 can be selected to abut or overlap field of view 302, thus providing continuous field of view from the zenith to the lower extent of vertical field of view 304.

Figures 4A, 4B, 4C:
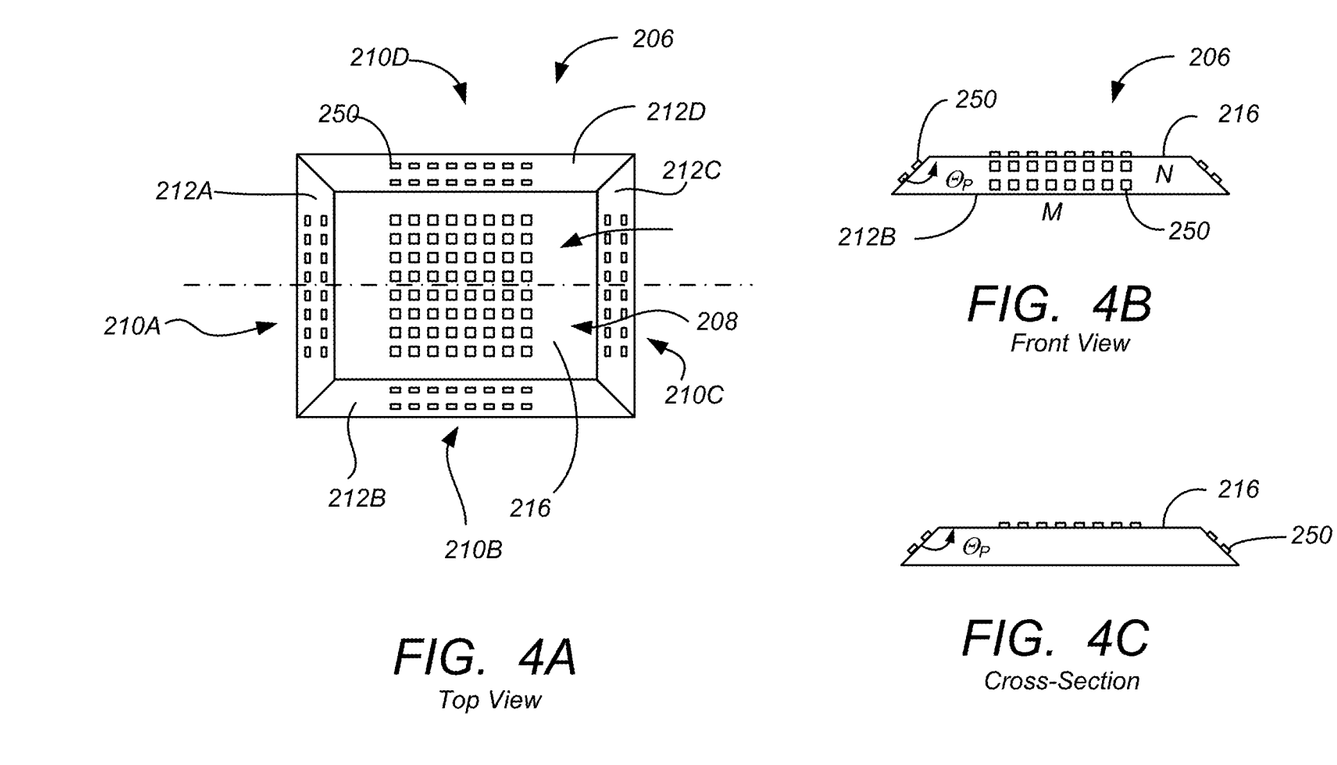
FIGS. 4A-4C are diagrams illustrating an embodiment of the integrated antenna assembly in which the peripheral surface is angled to form an angle with respect to the upper surface.

FIGS. 4A-4C are diagrams illustrating an embodiment of the IAA 106 in which the peripheral surface 212 is angled to form an angle $\Theta_P$ with respect to the first (upper) surface 216. This embodiment permits the center of the vertical field of view 304 to be angled upwards toward the field of view 302 about the zenith Z by an amount $\Theta_P$–90 degrees. This brings the boresight of the vertical field of view 304 towards the edge of the field of view 302 about the zenith, thus improving performance in the region where the field of views 302, 304 intersect or overlap. In this embodiment, $\Theta_P$>90 degrees, but other embodiments can be utilized where $\Theta_P$<90 degrees, and the peripheral surface 212 is angled away from zenith.

Figure 5A:
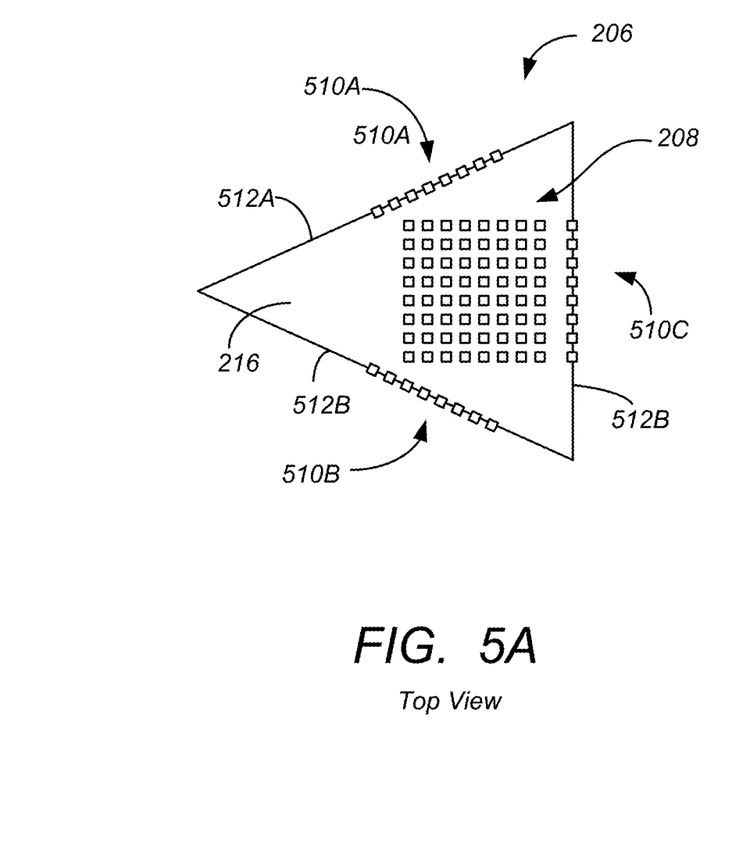
FIGS. 5A-5B are diagrams illustrating different embodiments of the peripheral surface.
Figure 5B:
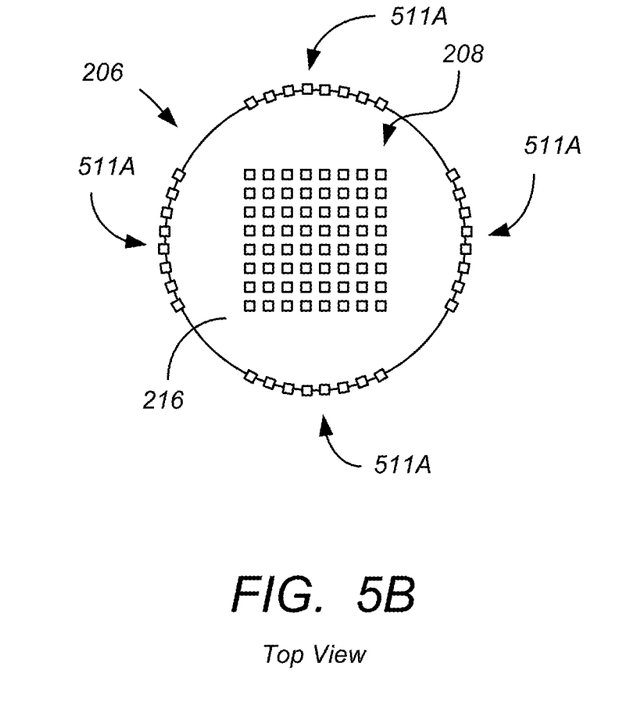

FIGS. 5A-5B are diagrams illustrating different embodiments of the peripheral surface 212. In the embodiments illustrated in FIG. 2A-2C, the peripheral surface had four sides 212A-212D, each having one of the further antenna arrays 210A-210D. Although illustrated as rectangular, the peripheral surface can be square in cross section, or can comprise four sides of different lengths (e.g. a quadrilateral).

FIG. 5A is a diagram of an embodiment in which the peripheral surface is triangular and includes three sides 512A-512C, each having a respective further array 510A-510C or further antenna elements 252. For aerodynamic purposes, the triangle can be an isosceles triangle, with the smallest angle directed toward the velocity vector of the vehicle 104. In one embodiment, the field of view of the further antenna arrays on each side is such that complete coverage in the horizontal plane is realized.

FIG. 5B is a diagram of an embodiment in which the peripheral surface is substantially circular, and has one or more of the further antenna arrays 511A-511A disposed at equal angular intervals along the peripheral surface. Four such further antenna arrays 511A-511D are illustrated, however, fewer or a greater number of arrays can be utilized. Although not illustrated the peripheral surface can also be elliptical, again with one or more of the further antenna arrays disposed thereon. In this embodiment, the major axis of the ellipse would typically be aligned with the velocity vector of the vehicle 104.

Figure 6A:
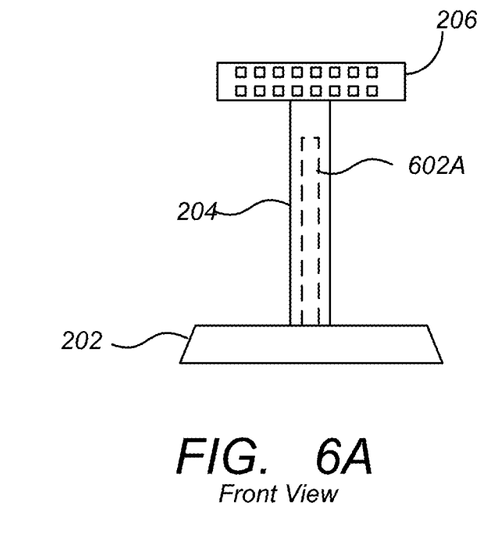
FIGS. 6A and 6B are diagrams illustrating another embodiment of the integrated antenna assembly.
Figure 6B:
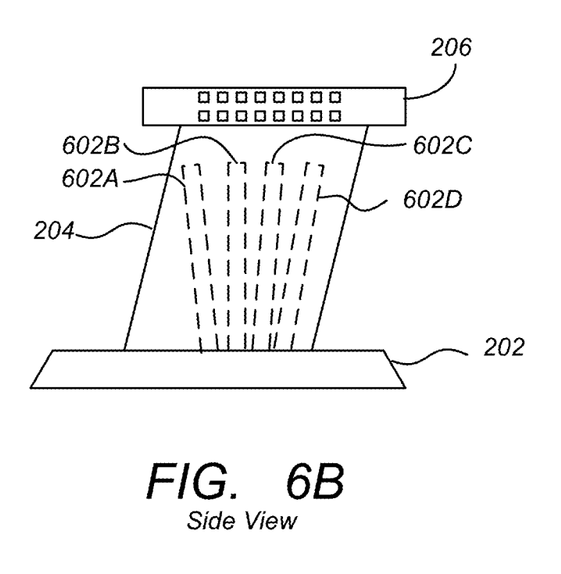

In one embodiment, the blade portion 204 comprises a blade antenna. Blade antennas are a variant of monopole antennas and typically include a flat conductor, often trapezoidal in shape for aerodynamic purposes. The conductor often includes notches to improve broadband performance. Such blade antennas can be used to service LTE frequency bands (2 GHz with a bandwidth of about 100 MHz) and/or 5G sub 6 GHz frequency bands FIGS. 6A and 6B are diagrams illustrating another embodiment of the IAA 106. In this embodiment, the blade portion comprises one or more monopole antennas 602A-602D disposed within the blade 204. The blade is transparent to RF energy in this embodiment. In one embodiment, the first antenna array 208 and the further antenna arrays 210 operate in a first frequency band and the one or more monopole antennas 602 operate in a second frequency band different than the first frequency band. For example, the first antenna array 208 and further antenna arrays 210 can operate in Ku and 5G millimeter wave bands of 12-86 GHz, while the one or more monopole antennas operate in a second frequency band below 6 GHz.

Figure 7:
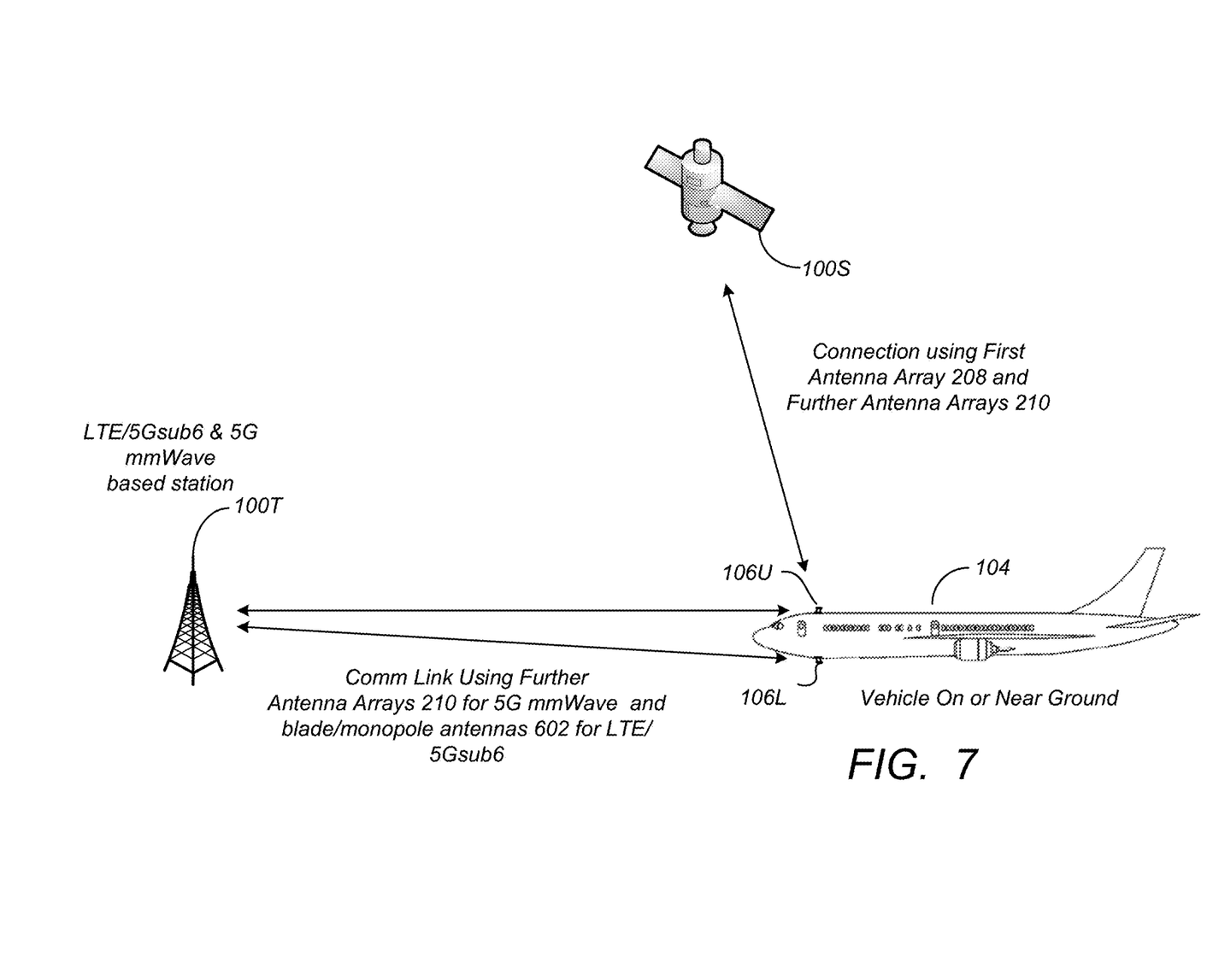
FIG. 7 is a diagram illustrating use cases for transmitting RF signals.

FIG. 7 is a diagram illustrating use cases for transmitting RF signals. In one use case, the first antenna array 208 and further antenna arrays 210 are used to transmit and receive information with a satellite transceiver 100S or other entity (e.g., aircraft) disposed above the vehicle 104 while the vehicle is on or near the ground. Satellite transceiver 100S, disposed directly above the vehicle 104, can be communicated with by the first antenna array 208, while satellites 100S disposed closer to the horizon can be communicated with by the one or more further antenna arrays 210.

Figure 8:
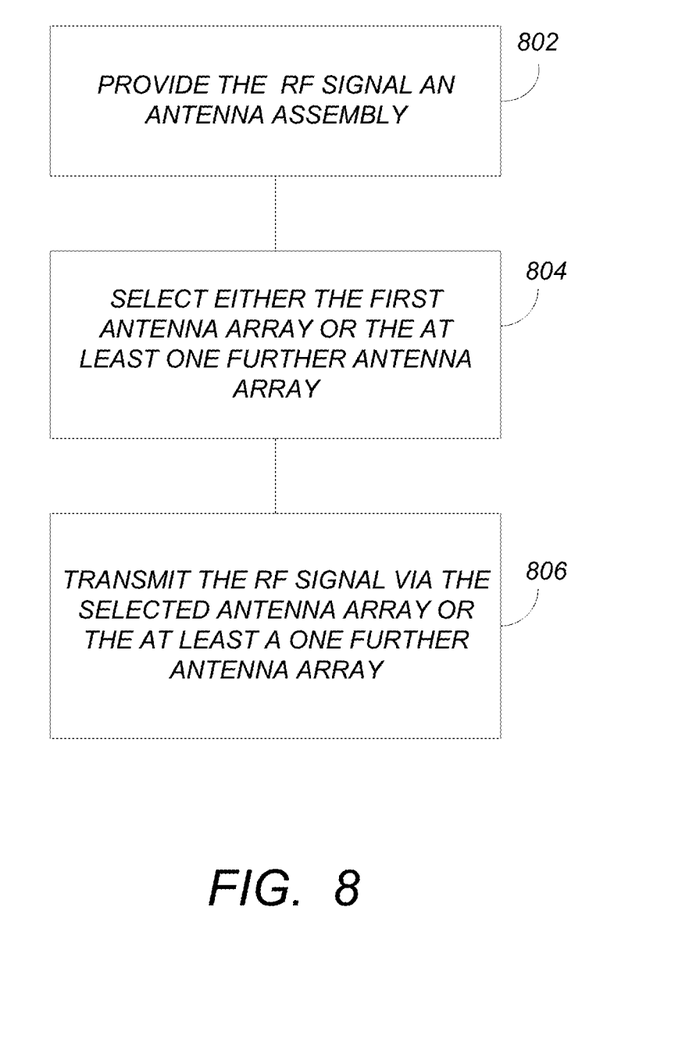
FIG. 8 is a diagram illustrating one embodiment of a method for transmitting an RF signal from an antenna assembly in a first use case.

FIG. 8 is a diagram illustrating one embodiment of a method for transmitting an RF signal from an antenna assembly in this first use case. In block 802, an RF signal is provided to the IAA 106. In block 804 either the first antenna array 208 or one or more of the further antenna arrays 210 are selected for transmitting the RF signal, depending, for example, on which field of view the satellite transceiver 102S is within. Which array 210 is used may also depend on the priority or type of communication data is being communicated. In block 806, the signal is transmitted via the selected first array or the one or more further antenna arrays 210.

In a second use case, the first antenna array 208 is used to communicate a first RF signal with the satellite 100S, while one or more of the further antenna arrays 210 are used to communicate a second RF signal with a terrestrial transceiver 102T. Such communications are independent and can occur concurrently.

Figure 9:
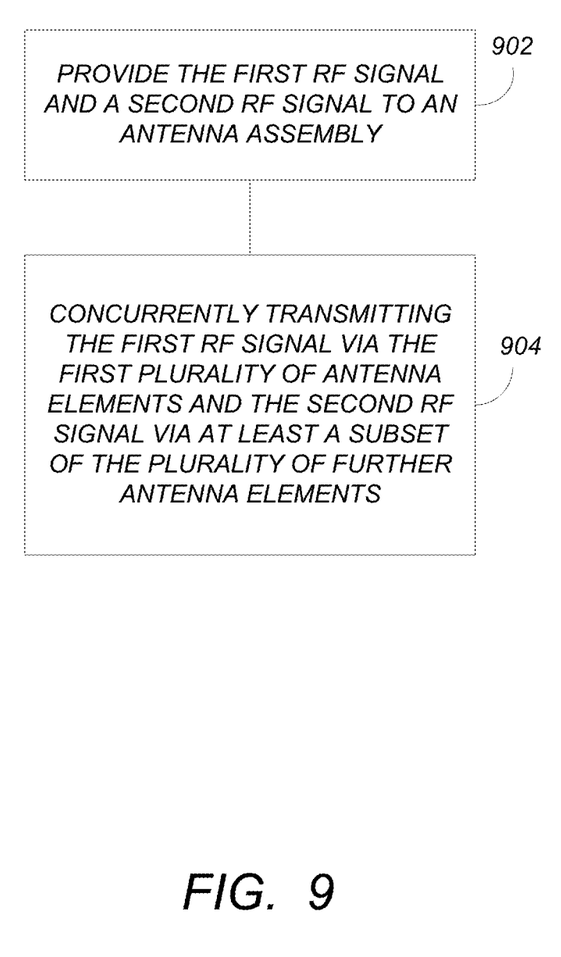
FIG. 9 is a diagram illustrating one embodiment of a method for transmitting a first RF signal and a second RF signal from an antenna assembly in a second use case.

FIG. 9 is a diagram illustrating one embodiment of a method for transmitting a first RF signal and a second RF signal from an antenna assembly in the second use case. In block 902, the first RF signal and second RF signal are provided to the IAA 106. In block 904, the first RF signal is concurrently transmitted via the first antenna array 208, and the second RF signal is transmitted via at least one of the further antenna arrays 210. In one example, the first RF signal is transmitted to the satellite via the first antenna array 208 and the second RF signal is transmitted to the terrestrial transceiver 102T via the further antenna arrays. In further embodiments include an antenna in the blade portion, such antennas can be used to communicate a third RF signal, for example to the terrestrial transceiver 102T or a terrestrial transceiver 102T.

Figure 10:
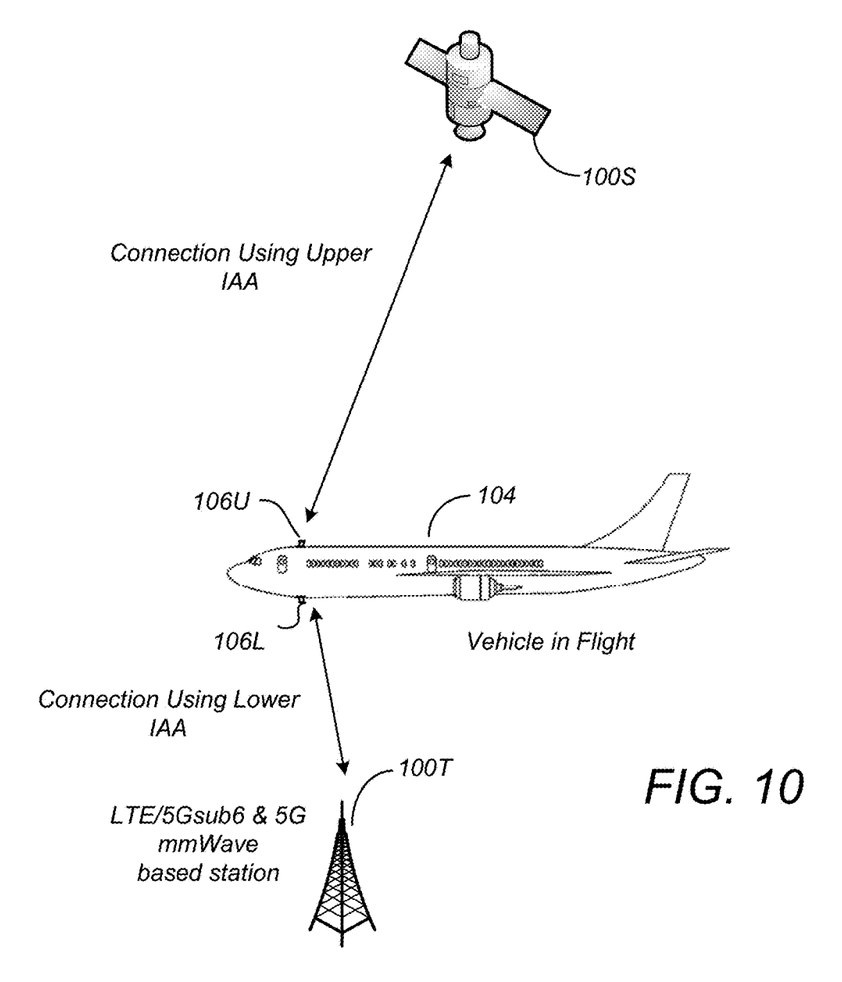
FIG. 10 is a diagram illustrating another use case.

FIG. 10 is a diagram illustrating another use case. In this use case, two IAAs 106 are used, including an upper IAA 106U and a lower IAA 106L. The upper IAA 106U is used to communicate with a first entity such as satellite 100S. Nominally, the first antenna array 208 is used, but the further antenna arrays 210 can also be used, particularly if the satellite transceiver 102S is near the horizon. Similarly, the lower IAA 106L is used to communicate with a second entity such as terrestrial transceiver 102T. Again, the first antenna array 208 is typically used, but the further antenna arrays 210 can also be used, particularly if the terrestrial transceiver 102T is near the horizon.

Hardware Environment

Figure 11:
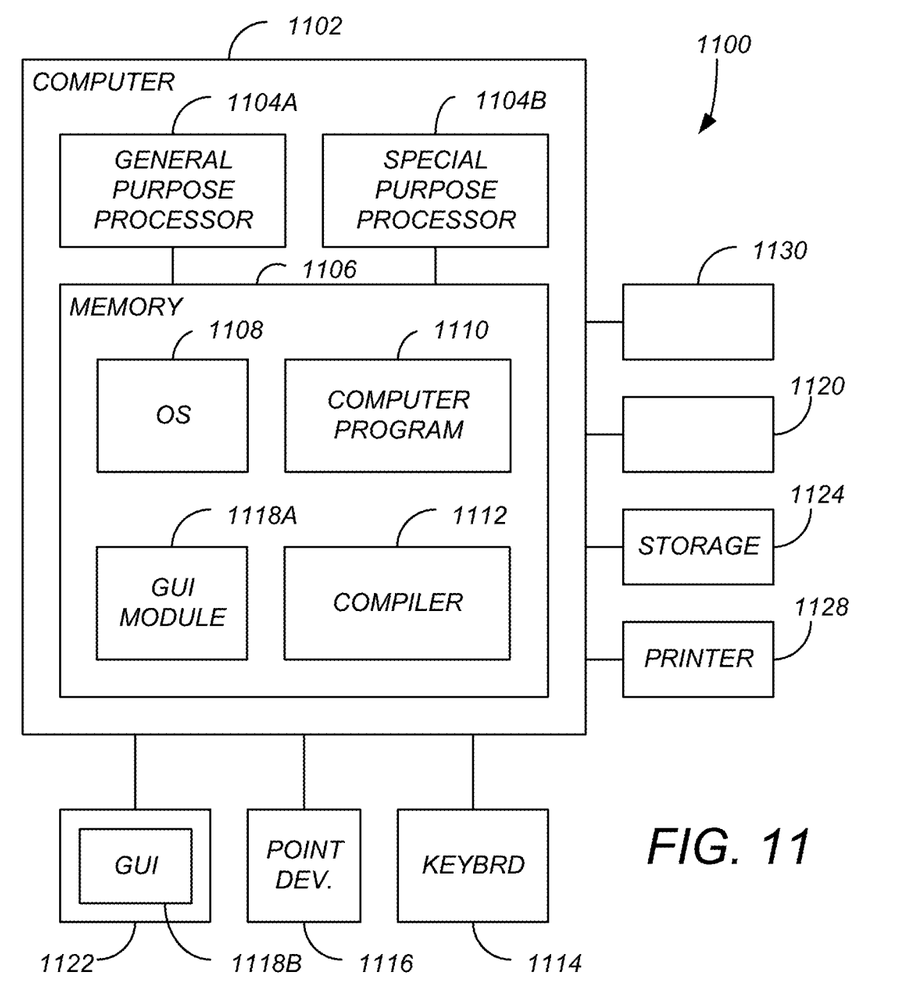
FIG. 11 illustrates an exemplary computer system that could be used to implement processing elements of the above disclosure.

FIG. 11 illustrates an exemplary computer system 1100 that could be used to implement processing elements of the above disclosure, including the control/RF module 262. The computer 1102 comprises a processor 1104 and a memory, such as random access memory (RAM) 1106. The computer 1102 is operatively coupled to a display 1122, which presents images such as windows to the user on a graphical user interface 1118B. The computer 1102 can be coupled to other devices, such as a keyboard 1114, a mouse device 1116, a printer 1128, etc. Of course, those skilled in the art will recognize that any combination of the above components, or any number of different components, peripherals, and other devices, can be used with the computer 1102.

Generally, the computer 1102 operates under control of an operating system 1108 stored in the memory 1106, and interfaces with the user to accept inputs and commands and to present results through a graphical user interface (GUI) module 1118A. Although the GUI module 1118B is depicted as a separate module, the instructions performing the GUI functions can be resident or distributed in the operating system 1108, the computer program 1110, or implemented with special purpose memory and processors. The computer 1102 also implements a compiler 1112 which allows an application program 1110 written in a programming language such as COBOL, C++, FORTRAN, or other language to be translated into processor 1104 readable code. After completion, the application 1110 accesses and manipulates data stored in the memory 1106 of the computer 1102 using the relationships and logic that was generated using the compiler 1112. The computer 1102 also optionally comprises an external communication device such as a modem, satellite link, Ethernet card, or other device for communicating with other computers.

In one embodiment, instructions implementing the operating system 1108, the computer program 1110, and the compiler 1112 are tangibly embodied in a computer-readable medium, e.g., data storage device 1120, which could include one or more fixed or removable data storage devices, such as a zip drive, floppy disc drive 1124, hard drive, CD-ROM drive, tape drive, etc. Further, the operating system 1108 and the computer program 1110 are comprised of instructions which, when read and executed by the computer 1102, causes the computer 1102 to perform the operations herein described. Computer program 1110 and/or operating instructions can also be tangibly embodied in memory 1106 and/or data communications devices 1130, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used. Further, the disclosure comprises embodiments that include An antenna assembly, including: a base portion, adapted to be coupled to an outer surface of a vehicle; a blade portion, having a first end coupled to the base portion and a second end; a top portion coupled to the second end of the blade portion distal from the first end of the blade portion, the top portion including: a first surface facing away from the base portion, the first surface having an first antenna array including a plurality of first antenna elements; a second surface facing the base portion; and a peripheral surface on a periphery of the top portion and disposed between the first surface and the second surface, the peripheral surface including one or more further antenna arrays having a plurality of further antenna elements.

Implementations may include one or more of the following features:

The foregoing antenna assembly wherein: the first antenna array has a first field of view toward a zenith; and the one or more further antenna arrays augment the first field of view to provide a combined field of view having field of view greater than the first field of view.

Any of the foregoing antenna assemblies, wherein a portion of the peripheral surface forms an angle $\theta$ with the first surface.

Any of the foregoing antenna assemblies, wherein $\theta > 45$ degree.

Any of the foregoing antenna assemblies wherein the one or more further arrays together provide an azimuthal field of view of 360 degrees.

Any of the foregoing antenna assemblies wherein: the peripheral surface includes three sides, wherein at least one side of the three sides has at least one of the further antenna arrays.

Any of the foregoing antenna assemblies wherein: the peripheral surface includes four sides, wherein at least one side of the four sides has at least one of the further antenna arrays.

Any of the foregoing antenna assemblies wherein: the peripheral surface is substantially circular, having the one or more further antenna arrays disposed thereon.

Any of the foregoing antenna assemblies wherein: the peripheral surface is substantially elliptical, having the one or more further antenna arrays disposed thereon.

Any of the foregoing antenna assemblies wherein the blade portion includes a blade antenna.

Any of the foregoing antenna assemblies further including one or more monopole antennas, disposed within the blade portion.

Any of the foregoing antenna assemblies wherein the first antenna array and the one or more further antenna arrays operate in a first frequency band and the one or more monopole antennas operate in a second frequency band.

Any of the foregoing antenna assemblies wherein the first frequency band is 10 to 86 GHz or Ku, K, Ka and V-band and the second frequency band is below 6 GHz.

Any of the foregoing antenna assemblies wherein the blade portion has a cross section elongated about an axis substantially co-linear with a velocity vector of the vehicle.

Any of the foregoing antenna assemblies wherein the top portion is disposed in a plane substantially perpendicular to a zenith.

Another embodiment is evidenced by a method of transmitting an RF signal from an antenna assembly, including: providing first RF signal to an antenna assembly, the antenna assembly including: a blade portion; a base portion, disposed at a first end of the blade portion, adapted to be coupled to an outer surface of a vehicle; and a top portion disposed at a second end of the blade portion distal from the first end of the blade portion, the top portion including: a first surface facing away from the base portion, the first surface having an first antenna array including a first plurality of antenna elements; a second surface facing the base portion;

and a peripheral surface on a periphery of the top portion and disposed between the first surface and the second surface, the peripheral surface including one or more further antenna arrays having a plurality of further antenna elements. The method of transmitting also includes selecting either the first antenna array or at least one of the further antenna arrays.

The above method may also include transmitting the RF signal via the selected first antenna array or the at least one of the further antenna arrays.

A still further embodiment is evidenced by a method of transmitting a first RF signal and transmitting a second RF signal via a same antenna assembly, including: providing the first RF signal and the second RF signal to an antenna assembly, the antenna assembly including: a blade portion; a base portion, disposed at a first end of the blade portion, adapted to be coupled to an outer surface of a vehicle; and a top portion disposed at a second end of the blade portion distal from the first end of the blade portion, the top portion including: a first surface facing away from the base portion, the first surface having an first antenna array including a first plurality of antenna elements; a second surface facing the base portion; a peripheral surface on a periphery of the top portion and disposed between the first surface and the second surface, the peripheral surface including one or more further antenna arrays having a plurality of further antenna elements.

Implementations may include one or more of the following features:

The foregoing method wherein concurrently transmitting the first RF signal via the first plurality of antenna elements and the second RF signal via at least a subset of the plurality of further antenna elements.

Any of the foregoing methods wherein: the antenna assembly further includes one or more monopole antennas, disposed within the blade portion; the method further includes: transmitting a third RF signal via the one or more monopole antennas.

Any of the methods described above, wherein the first antenna array and the one or more further antenna arrays operate in a first frequency band and the one or more monopole antennas operate in a second frequency band.

Any of the methods described above, wherein the first frequency band is 10 to 86 GHz or Ku, K, Ka, V-bands and the second frequency band is below 6 GHz. The antenna assembly may also include multi system multi band antenna and antenna arrays assembly.

CONCLUSION

This concludes the description of the preferred embodiments of the present disclosure.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

To the extent that terms "includes," "including," "has," "contains," and variants thereof are used herein, such terms are intended to be inclusive in a manner similar to the term "comprises" as an open transition word without precluding any additional or other elements.

What is claimed is:

1. An antenna assembly, comprising:
    a base portion, adapted to be coupled to an outer surface of a vehicle;
    a blade portion, having a first end coupled to the base portion and a second end;
    a top portion coupled to the second end of the blade portion distal from the first end of the blade portion, the top portion comprising:
        a first surface facing away from the base portion, the first surface having an first antenna array including a plurality of first antenna elements;
        a second surface facing the base portion; and
        a peripheral surface on a periphery of the top portion and disposed between the first surface and the second surface, the peripheral surface comprising one or more further antenna arrays having a plurality of further antenna elements.

2. The antenna assembly of claim 1, wherein:
    the first antenna array has a first field of view toward a zenith; and
    the one or more further antenna arrays augment the first field of view to provide a combined field of view having field of view greater than the first field of view.

3. The antenna assembly of claim 1, wherein a portion of the peripheral surface forms an angle θ with the first surface.

4. The antenna assembly of claim 3, wherein θ>45 degree.

5. The antenna assembly of claim 1, wherein the one or more further arrays together provide an azimuthal field of view of 360 degrees.

6. The antenna assembly of claim 5, wherein:
    the peripheral surface includes three sides, wherein at least one side of the three sides has at least one of the further antenna arrays.

7. The antenna assembly of claim 5, wherein:
    the peripheral surface includes four sides, wherein at least one side of the four sides has at least one of the further antenna arrays.

8. The antenna assembly of claim 5, wherein:
    the peripheral surface is substantially circular, having the one or more further antenna arrays disposed thereon.

9. The antenna assembly of claim 5, wherein:
    the peripheral surface is substantially elliptical, having the one or more further antenna arrays disposed thereon.

10. The antenna assembly of claim 1, wherein the blade portion comprises a blade antenna.

11. The antenna assembly of claim 1, further comprising one or more monopole antennas, disposed within the blade portion.

12. The antenna assembly of claim 11, wherein the first antenna array and the one or more further antenna arrays operate in a first frequency band and the one or more monopole antennas operate in a second frequency band.

13. The antenna assembly of claim 12, wherein the first frequency band is 10 to 86 GHz or Ku, K, Ka and V-band and the second frequency band is below 6 GHz.

14. The antenna assembly of claim 1, wherein the blade portion has a cross section elongated about an axis substantially co-linear with a velocity vector of the vehicle.

15. The antenna assembly of claim 1, wherein the top portion is disposed in a plane substantially perpendicular to a zenith.

16. A method of transmitting an RF signal from an antenna assembly, comprising:
    providing first RF signal to an antenna assembly, the antenna assembly comprising:

a blade portion;

a base portion, disposed at a first end of the blade portion, adapted to be coupled to an outer surface of a vehicle; and a top portion disposed at a second end of the blade portion distal from the first end of the blade portion, the top portion comprising:

a first surface facing away from the base portion, the first surface having an first antenna array including a first plurality of antenna elements;

a second surface facing the base portion; and a peripheral surface on a periphery of the top portion and disposed between the first surface and the second surface, the peripheral surface comprising one or more further antenna arrays having a plurality of further antenna elements;

selecting either the first antenna array or at least one of the further antenna arrays; and transmitting the RF signal via the selected first antenna array or the at least one of the further antenna arrays.

17. The method of claim 16, wherein:

the antenna assembly further comprises one or more monopole antennas, disposed within the blade portion;

the method further comprises:

transmitting a third RF signal via the one or more monopole antennas.

18. A method of transmitting a first RF signal and transmitting a second RF signal via a same antenna assembly, comprising:

providing the first RF signal and the second RF signal to an antenna assembly, the antenna assembly comprising:

a blade portion;

a base portion, disposed at a first end of the blade portion, adapted to be coupled to an outer surface of a vehicle; and a top portion disposed at a second end of the blade portion distal from the first end of the blade portion, the top portion comprising:

a first surface facing away from the base portion, the first surface having an first antenna array including a first plurality of antenna elements;

a second surface facing the base portion;

a peripheral surface on a periphery of the top portion and disposed between the first surface and the second surface, the peripheral surface comprising one or more further antenna arrays having a plurality of further antenna elements;

concurrently transmitting the first RF signal via the first plurality of antenna elements and the second RF signal via at least a subset of the plurality of further antenna elements.

19. The method of claim 18, wherein:

the antenna assembly further comprises one or more monopole antennas, disposed within the blade portion;

the method further comprises:

transmitting a third RF signal via the one or more monopole antennas.

20. The method of claim 19, wherein the first antenna array and the one or more further antenna arrays operate in a first frequency band and the one or more monopole antennas operate in a second frequency band.

* * * * *